(12) United States Patent
Sato et al.

(10) Patent No.: US 12,003,854 B2
(45) Date of Patent: Jun. 4, 2024

(54) IMAGING DEVICE, STORAGE MEDIUM, AND METHOD OF CONTROLLING IMAGING DEVICE

(71) Applicant: CANON KABUSHIKI KAISHA, Tokyo (JP)

(72) Inventors: Natsuko Sato, Kanagawa (JP); Ryo Kawasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 213 days.

(21) Appl. No.: 17/677,132

(22) Filed: Feb. 22, 2022

(65) Prior Publication Data

US 2022/0272274 A1 Aug. 25, 2022

(30) Foreign Application Priority Data

Feb. 24, 2021 (JP) ................................. 2021-027430

(51) Int. Cl.
*H04N 23/67* (2023.01)
*G03B 13/34* (2021.01)
*G06T 7/70* (2017.01)
*H04N 23/695* (2023.01)

(52) U.S. Cl.
CPC ........... *H04N 23/675* (2023.01); *G03B 13/34* (2013.01); *G06T 7/70* (2017.01); *H04N 23/695* (2023.01); *G06T 2207/10148* (2013.01)

(58) Field of Classification Search
None
See application file for complete search history.

(56) References Cited

U.S. PATENT DOCUMENTS

| | | | | |
|---|---|---|---|---|
| 5,574,498 A | * | 11/1996 | Sakamoto | H04N 23/695 348/172 |
| 10,178,300 B2 | * | 1/2019 | Rivard | H04N 5/265 |
| 2008/0165272 A1 | * | 7/2008 | Toguchi | H04N 23/695 348/E5.045 |
| 2011/0019021 A1 | * | 1/2011 | Yoshizumi | H04N 23/611 348/222.1 |
| 2013/0342752 A1 | * | 12/2013 | Sugawara | H04N 23/611 348/349 |
| 2017/0272658 A1 | * | 9/2017 | Ito | H04N 23/55 |
| 2018/0063411 A1 | * | 3/2018 | Rivard | H04N 23/54 |

(Continued)

FOREIGN PATENT DOCUMENTS

| | | |
|---|---|---|
| JP | 2003-075716 A | 3/2003 |
| JP | 2017-173802 A | 9/2017 |

*Primary Examiner* — Stefan Gadomski
(74) *Attorney, Agent, or Firm* — Cowan, Liebowitz & Latman, P.C.

(57) ABSTRACT

An imaging device includes a focus driving unit for driving a focus lens; a tilting driving unit for tilting at least one of an image sensor and an imaging optical system; a detection unit for detecting a subject in an image; a setting unit for setting a plurality of focus regions in the image based on positional information of the subject detected in the image; a determination unit for determining respective driving amounts for the focus driving unit and for the tilting driving unit based on the positional information and focal information of the plurality of focus regions so that the plurality of focus regions is in focus; and a control unit for controlling the focus driving unit and the tilting driving unit based on the determined respective driving amounts.

15 Claims, 11 Drawing Sheets

(56) References Cited

U.S. PATENT DOCUMENTS

| | | | |
|---|---|---|---|
| 2019/0199912 A1* | 6/2019 | Nagano | H04N 23/67 |
| 2020/0137313 A1* | 4/2020 | Sato | H04N 23/695 |
| 2020/0177817 A1* | 6/2020 | Osawa | H04N 23/69 |
| 2020/0336671 A1* | 10/2020 | Lee | H04N 23/695 |
| 2021/0099652 A1* | 4/2021 | Kagaya | H04N 23/69 |
| 2021/0326608 A1* | 10/2021 | Yoshimi | G06V 20/58 |

* cited by examiner

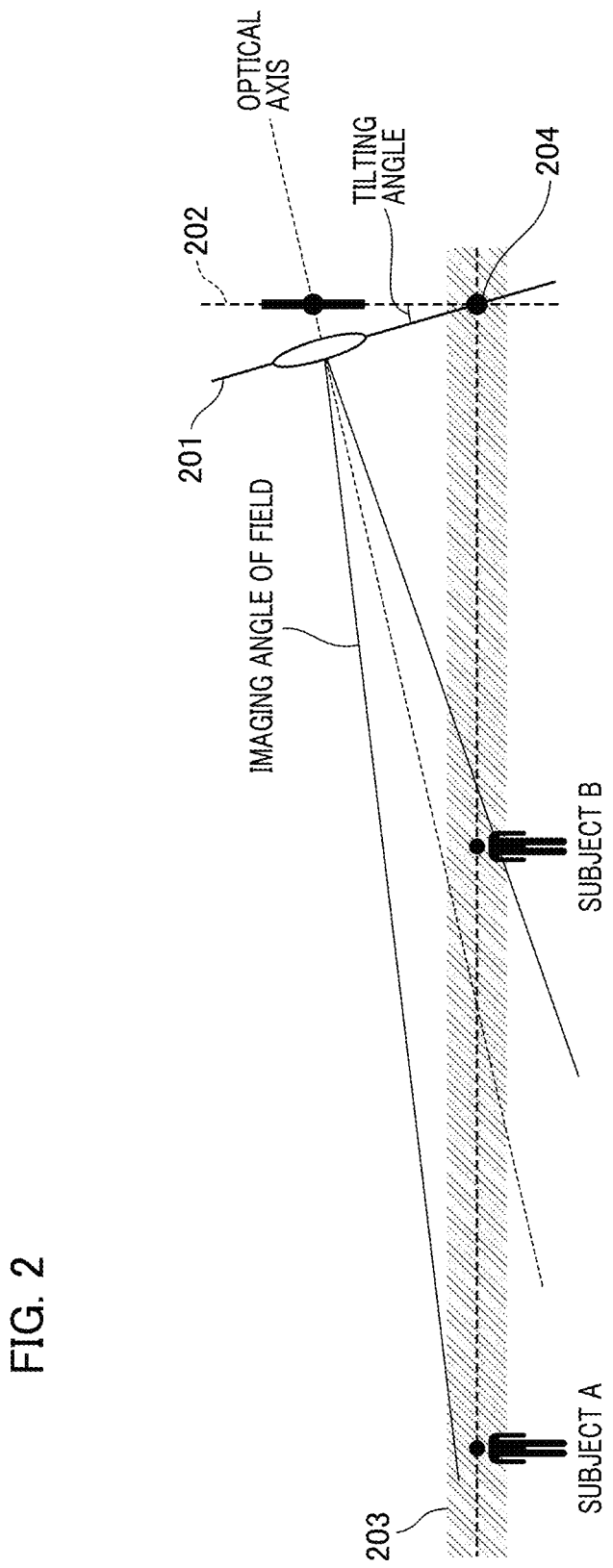

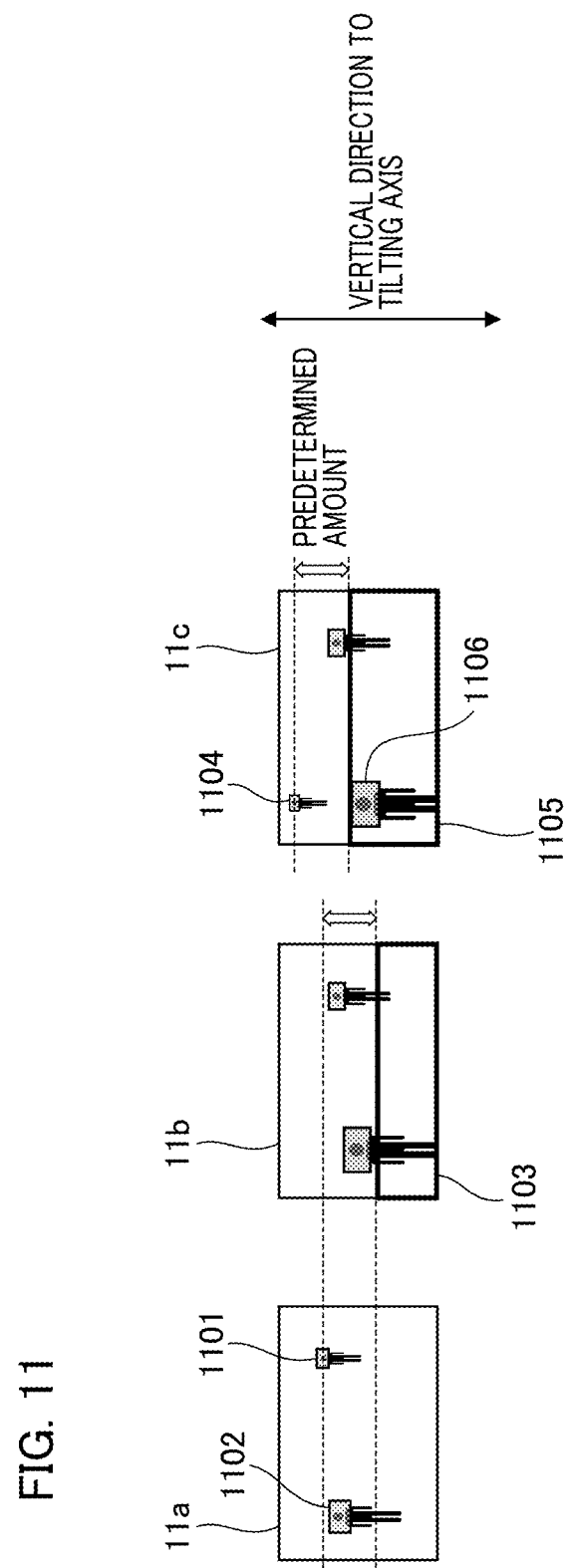

IMAGING DEVICE, STORAGE MEDIUM, AND METHOD OF CONTROLLING IMAGING DEVICE

BACKGROUND OF THE INVENTION

Field of the Invention

The present invention relates to an imaging device and the like capable of performing tilting control.

Description of the Related Art

Technology referred to as the Scheimpflug principle for changing a depth of field of an imaging scene by tilting an imaging surface or an imaging optical system on which subjects are imaged with respect to an imaging optical axis surface orthogonal to an imaging optical axis system (hereinafter referred to as tilting control) and adjusting a focus surface are known. For cameras for surveillance purposes, there are demands to obtain videos with deep depth of field. Therefore, by using this technology, it is possible to deepen the depth of field without narrowing down a diaphragm, and thus it is possible to obtain a video in which an entire imaged region is in focus while reducing subject blur or noise due to an insufficient amount of light.

Japanese Unexamined Patent Publication No. 2003-75716 discloses a technology for performing focus detection calculation at a plurality of focus points and controlling focus at the plurality of focus points based on a result of the focus detection calculation. Japanese Unexamined Patent Publication No. 2017-173802 discloses a technology for performing focus control such that a plurality of out-of-focus amounts are the minimum based on out-of-focus amounts of a plurality of focus detection areas.

However, in an imaging device disclosed in Japanese Unexamined Patent Publication No. 2003-75716, a method of selecting a plurality of focus points is not mentioned and there is a possibility of a surveillance target subject not being in focus. In an imaging device disclosed in Japanese Unexamined Patent Publication No. 2017-173802, a focus detection area with a minimum out-of-focus amount is selected manually among a plurality of focus detection areas or a method of forming a focus surface is selected in a mode from a horizontal, vertical, or oblique direction, and thus time and effort of a user is required.

Accordingly, an objective of the present invention is to provide an imaging device capable of easily performing tilting control appropriate for a scene.

SUMMARY OF THE INVENTION

To solve the foregoing problems, an imaging device according to an aspect of the present invention comprises
  a focus driving unit configured to drive a focus lens;
  a tilting driving unit configured to tilt at least one of an image sensor and an imaging optical system with respect to a surface orthogonal to an optical axis of the imaging optical system:
  at least one processor or circuit configured to function as:
  a detection unit configured to detect a subject in an image:
  a setting unit configured to set a plurality of focus regions in the image based on positional information of the subject detected in the image;
  a determination unit configured to determine respective driving amounts for the focus driving unit and for the tilting driving unit based on the positional information and focal information of the plurality of focus regions so that the plurality of focus regions is in focus; and
  a control unit configured to control the focus driving unit and the tilting driving unit based on the determined respective driving amounts.

Further features of the present invention will become apparent from the following description of embodiments with reference to the attached drawings.

BRIEF DESCRIPTION OF THE DRAWINGS

FIG. 2 is a schematic diagram illustrating tilting control of the imaging device according to the embodiment.

FIG. 11 is a schematic diagram illustrating setting of first and second regions according to the third embodiment.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate description will be omitted or simplified.

Embodiments

Figure 1:
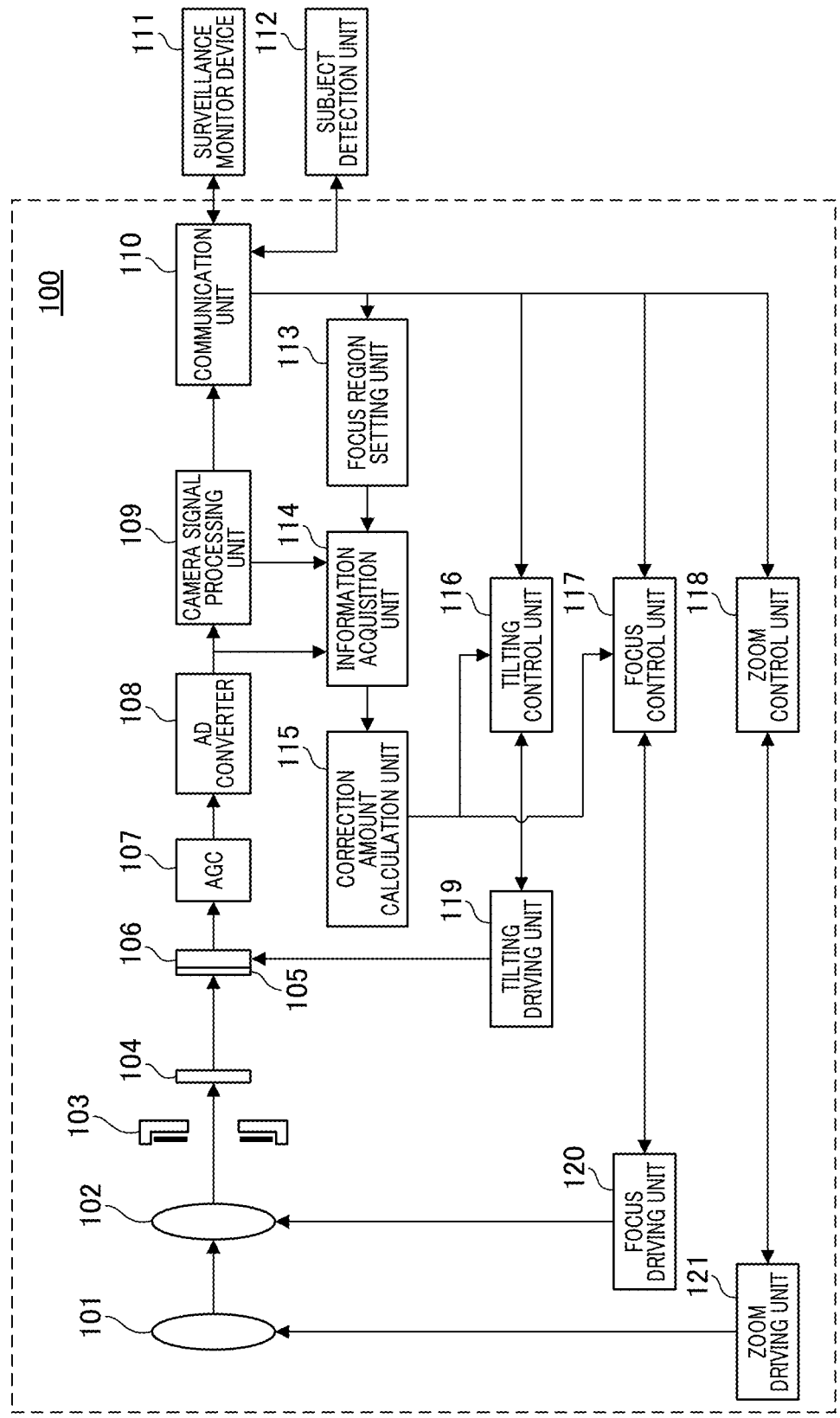
FIG. 1 is a block diagram illustrating an overall configuration of an imaging device according to an embodiment of the present invention.

FIG. 1 is a block diagram illustrating an overall configuration of an imaging device 100 according to an embodiment of the present invention. An imaging optical system includes a zoom lens 101 that is moved in an optical axis direction to change a focus distance, a focus lens 102 that is moved in the optical axis direction to perform focus adjustment, and a diaphragm unit 103 that adjusts an amount of light.

Light passing through the imaging optical system forms a subject image as an optical image on an image sensor 106 via a bandpass filter (hereinafter referred to as a BPF) 104 and a color filter 105. The BPF 104 can be advanced or retreated along an optical path of the imaging optical system. The subject image is photoelectrically converted by the image sensor 106 to form an imaging signal.

A gain of an analog imaging signal output from the image sensor 106 is adjusted by an auto gain control (AGC) 107, the analog imaging signal is converted into a digital signal by an AD converter 108, and subsequently the digital signal is input to a camera signal processing unit 109.

The camera signal processing unit 109 generates a video signal by performing various kinds of image processing (for example, gamma conversion, white balance adjustment, and the like) on a digital imaging signal.

The video signal is output to a surveillance monitor device 111 connected by a wired or wireless network through a communication unit 110. By displaying the video signal as an image on a display unit of the surveillance monitor device 111, it is possible to display an imaging screen. The surveillance monitor device 111 may be an external device of the imaging device 100. An instruction from a user is received from the surveillance monitor device 111 and control signals such as commands are output to a focus region setting unit 113, a tilting control unit 116, a focus control unit 117, and a zoom control unit 118 in the imaging device 100 through the communication unit 110.

A subject detection unit 112 performs a process of detecting a predetermined subject in response to an input of the video signal. The subject detection unit 112 automatically detects, for example, a face of a person, a number plate of a vehicle, a predetermined object, or the like. Information regarding the subject detected by the subject detection unit 112 is sent to the focus region setting unit 113 through the communication unit 110. Here, the subject detection unit 112 may be provided outside of the imaging device, or may be contained in the imaging device.

The focus region setting unit 113 sets a region which is to be in focus (a focus region) based on an instruction which is transmitted from the communication unit 110 and includes the information regarding the subject sent from the subject detection unit 112.

An information acquisition unit 114 acquires focal information and positional information in the focus region set by the focus region setting unit 113 from the AD converter 108 or the camera signal processing unit 109. The details of the focal information and the positional information will be described below.

A correction amount calculation unit 115 functions as a determination unit (an acquisition unit) that acquires and determines a correction amount of focus control and a correction amount of tilting control to obtain a desired focus surface. More specifically, the correction amount calculation unit 115 calculates the correction amount of the focus control and the correction amount of the tilting control in order to obtain the desired focus surface. Instead of the calculation, the correction amounts may be stored as tables in a memory and the correction amounts may be acquired and determined from the tables. That is, the acquisition and determination of the correction amounts by the correction amount calculation unit 115 serving as the determination unit (the acquisition unit) include not only calculation but also acquisition and determination of the correction amounts from the memory.

The tilting control unit 116 gives an instruction for a tilting setting position to a tilting driving unit 119 based on a tilting correction amount calculated by the correction amount calculation unit 115 or an instruction from the communication unit 110.

The focus control unit 117 gives an instruction for a focus setting position to a focus driving unit 120 based on a focus correction amount calculated by the correction amount calculation unit 115 or an instruction from the communication unit 110.

The zoom control unit 118 gives an instruction for a zoom setting position to a zoom driving unit 121 based on an instruction from the communication unit 110.

The tilting driving unit 119 drives the image sensor 106 based on the tilting setting position instruction from the tilting control unit 116. In the embodiment, an example in which tilting control is performed by tilting the image sensor 106 with respect to the imaging optical system will be described. However, the tilting control may be performed by tilting the imaging optical system with respect to the image sensor 106.

The focus driving unit 120 drives the focus lens 102 based on the focus setting position instruction from the focus control unit 117.

The zoom driving unit 121 drives the zoom lens 101 in accordance with the zoom setting position instruction from the zoom control unit 118.

The tilting control will be described with reference to FIGS. 2 and 3. FIG. 2 is a schematic diagram illustrating tilting control of the imaging device 100 according to the embodiment. The drawing shows an example in which tilting control is performed such that two subjects of which distances from the imaging device 100 (subject distances) are different are in focus at heights of the faces of the two subjects. That is, here, the tilting control is performed such that the faces of persons who are subjects are in focus. The principle of the tilting control is called the Scheimpflug principle and is a principle that, when an optical system main surface 201 and an imaging surface 202 meet at a certain point (a Scheimpflug point 204), a focus surface 203 also meets at that point. When f is a focal distance, L is a subject distance, and θ is an angle of dip, a tilting angle α is calculated with Expression 1 from the Scheimpflug principle.

$$\alpha = \tan^{-1}(f/L \tan \theta) \quad (\text{式 } 1) \qquad \text{(Expression 1)}$$

Thus, all the subjects from a short distance to a long distance can be in focus on a certain plane.

Figure 3A:
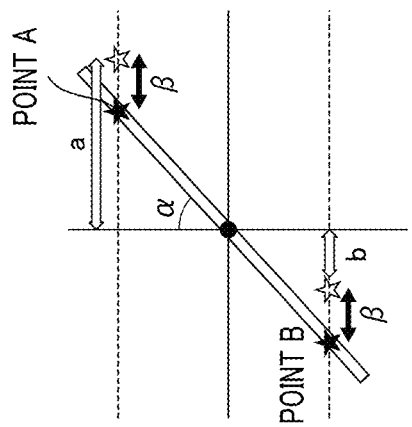
FIG. 3A is a schematic diagram illustrating a scene which is a tilting control target.
Figure 3B:
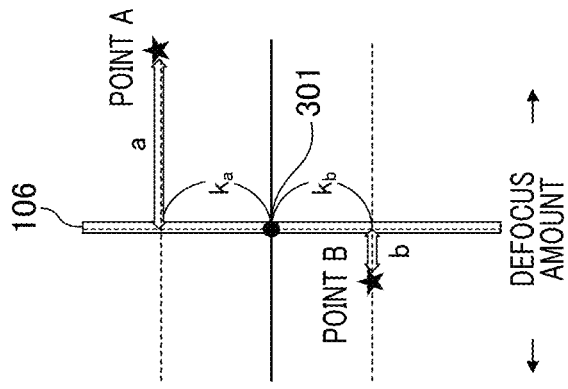
FIG. 3B is a schematic diagram illustrating a relation between a position of an image sensor 106, and a focus position (a point A) of a subject A and a focus position (a point B) of a subject B in the scene of FIG. 3A.
Figure 3C:
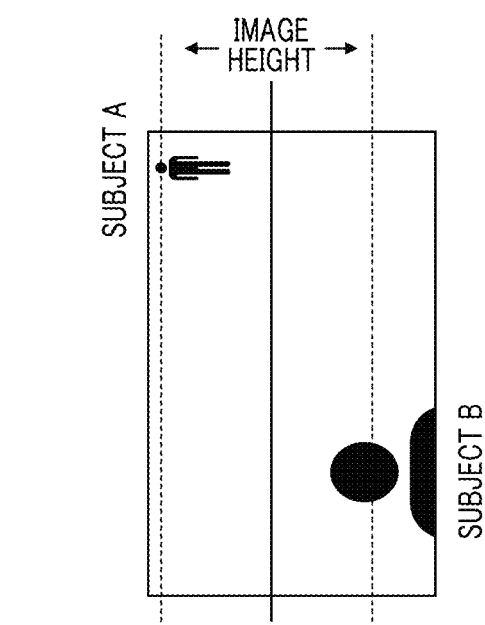
FIG. 3C is a schematic diagram illustrating a state in which tilting control is performed to focus on the subjects A and B.

FIGS. 3A to 3C are schematic diagrams illustrating a method of calculating a tilting correction amount and a focus correction amount. FIG. 3A is a schematic diagram illustrating a scene which is a tilting control target. In the scene of FIG. 3A, two subjects of which distances from the imaging device 100 are different, subjects A and B, are included. Here, tilting control in a case in which the subjects are both in focus at heights of the faces of the subjects A and B will be described. FIG. 3B is a schematic diagram illustrating a relation between a position of the image sensor 106, and a focus position (a point A) of the subject A and a focus position (a point B) of the subject B in the scene of FIG. 3A. FIG. 3C is a schematic diagram illustrating a state in which tilting control is performed to focus on the subjects A and B. To focus on both of the subjects A and B, as illustrated in FIG. 3C, the image sensor 106 and the focus lens 102 are controlled such that an imaging surface is matched with the points A and B. Here, it is assumed that $k_a$ and $k_b$ are distances from a tilting axis 301 on the image sensor 106 to the subjects A and B, respectively, and a and b are defocus amounts of the subjects A and B with respect to a position of the image sensor 106 (which is also referred to as the degree of focus), respectively. In this case, a tilting correction amount α and a focus correction amount β are calculated with Expressions 2 and 3.

$$\alpha = \tan^{-1}(a+b/k_a+k_b) \quad (\text{式 } 2) \qquad \text{(Expression 2)}$$

$$\beta = (k_b a - k_a b)/(k_a + k_b) \quad (\text{式 } 3) \qquad \text{(Expression 3)}$$

Here, the tilting axis 301 is a central rotation axis when the image sensor 106 is tilted.

However, in the method of calculating the correction amounts, the correction amounts can be calculated when two or more subjects of which distances from the imaging device 100 are different are not included in a scene. Accordingly, in imaging of a scene which does not include two or more subjects of which distances from the imaging device 100 are different, for example, a scene including only subjects of which subject distances are equal or a scene in which the number of subjects is singular, a situation in which the tilting control cannot be performed may occur. When the number of subjects is singular, focus can be adjusted through focus control. However, depending on a lens, focus control in which a subject is followed cannot be performed in some cases. When a speed of a subject is fast, the subject cannot be followed in some cases. On the other hand, in imaging in which focus is adjusted through the tilting control, subjects can be in focus at given heights of the subjects from the rear to the front without moving a focus lens.

In a case of imaging in which scenes are frequently switched because of changes in positions of pan, tilt, and zoom mechanisms in an imaging device including the pan, tilt, and zoom mechanisms, it is particularly important to improve responsiveness of focus adjustment through the tilting control. In the focus adjustment through the tilting control, it is necessary to reperform the adjustment through the tilting control basically when scenes are switched. However, when a waiting time occurs until a correction amount for the adjustment can be calculated each time, subjects are overlooked many times. Together with the switching of the scenes, it is required to provide the tilting control appropriate for the scenes when the adjustment through the tilting control with high responsiveness is reperformed.

In the following embodiments, a method of shortening a time until completion of adjustment with high responsiveness of adjustment through tilting control by setting regions in which correction amounts are calculated in a short time without the time and effort of a user manually selecting regions which are in focus in association with detection of subjects will be described.

First Embodiment

A first embodiment relates to a method of setting at least two focus regions in a scene including a plurality of subjects of which distances from the imaging device 100 are different in any one frame of a captured video and performing adjustment through the tilting control.

Figure 4:
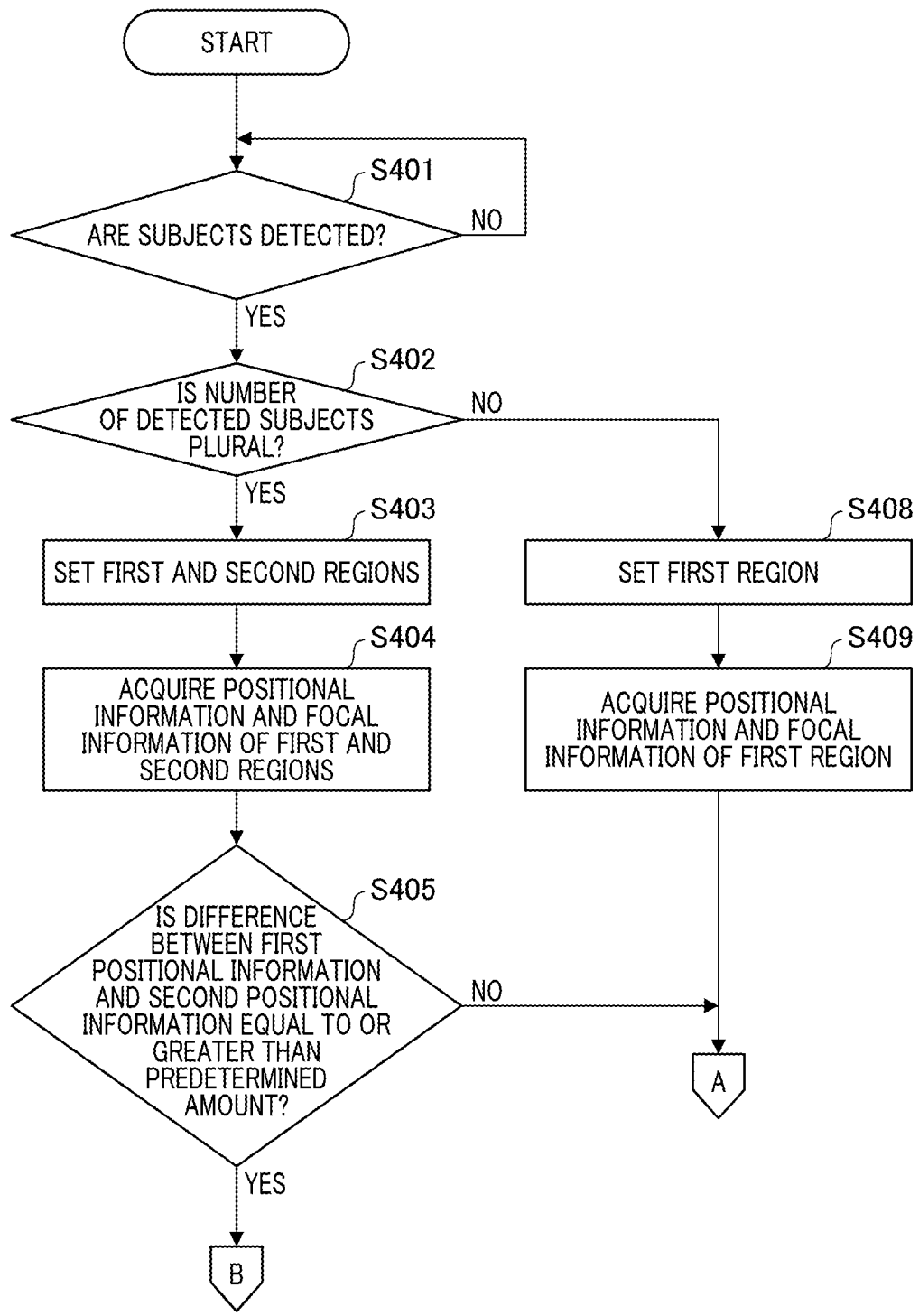
FIG. 4 is a flowchart illustrating a tilting control process performed by the imaging device.
Figure 5:
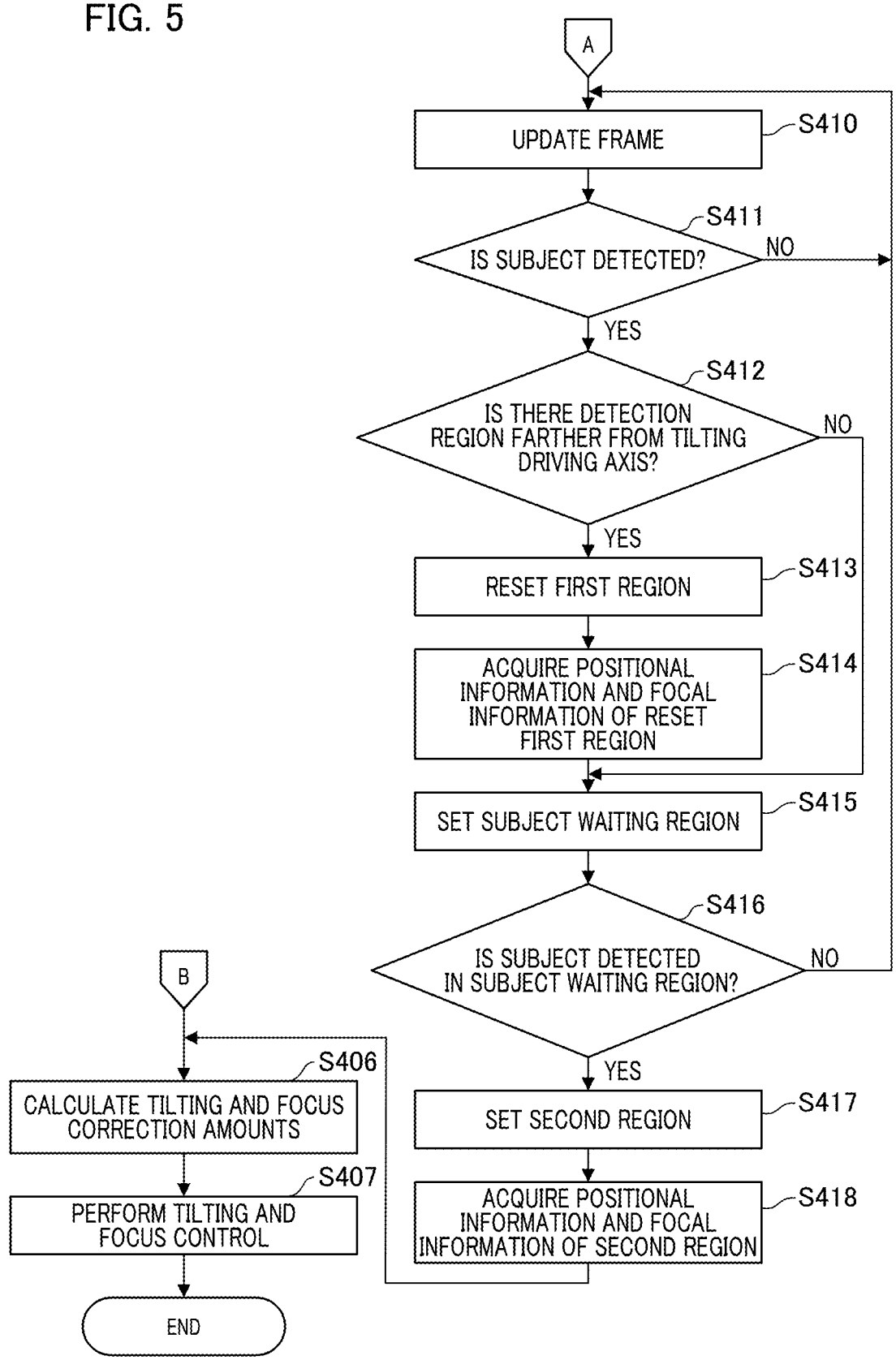
FIG. 5 is a flowchart illustrating the tilting control process performed by the imaging device.

Hereinafter, a sequence in which the imaging device 100 performs a tilting control process according to the first embodiment will be described with reference to FIGS. 4 and 5. FIGS. 4 and 5 are flowcharts illustrating a tilting control process performed by the imaging device 100.

Step S401

Figure 6:
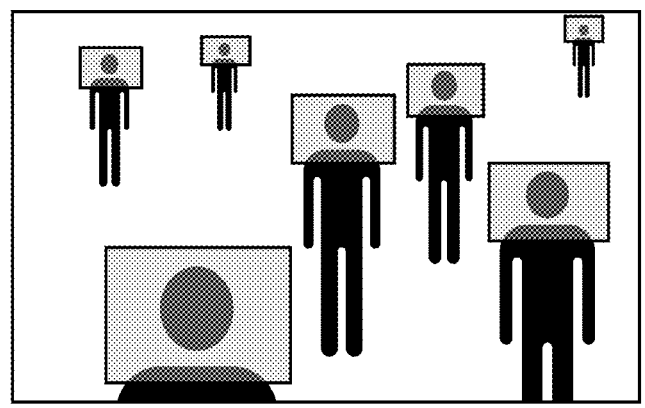
FIG. 6 is a schematic diagram illustrating an example of an imaging frame which is a target in a first embodiment.

In step S401, the focus region setting unit 113 determines whether a subject is detected in an input image, that is, any captured image (imaging frame). Specifically, the focus region setting unit 113 determines whether a subject is detected in an imaging frame based on information which is transmitted from the subject detection unit 112 and acquired through the communication unit 110. FIG. 6 is a schematic diagram illustrating an example of an imaging frame which is a target in the first embodiment. When the subject detection unit 112 performs the detection on the faces of people who are subjects as targets, rectangular portions are detected as subjects. That is, in the imaging frame which is a target in the embodiment, a plurality of subjects are detected in the one imaging frame.

Step S402

In step S402, when it is determined in step S401 that the subjects are detected (Yes), the focus region setting unit 113 determines whether the number of detected subjects is a plural. In the imaging frame which is a target in the first embodiment, as illustrated in FIG. 6, the number of detected subjects is plural (Yes). Thus, the process proceeds to step S403.

Step S403

Figure 7:
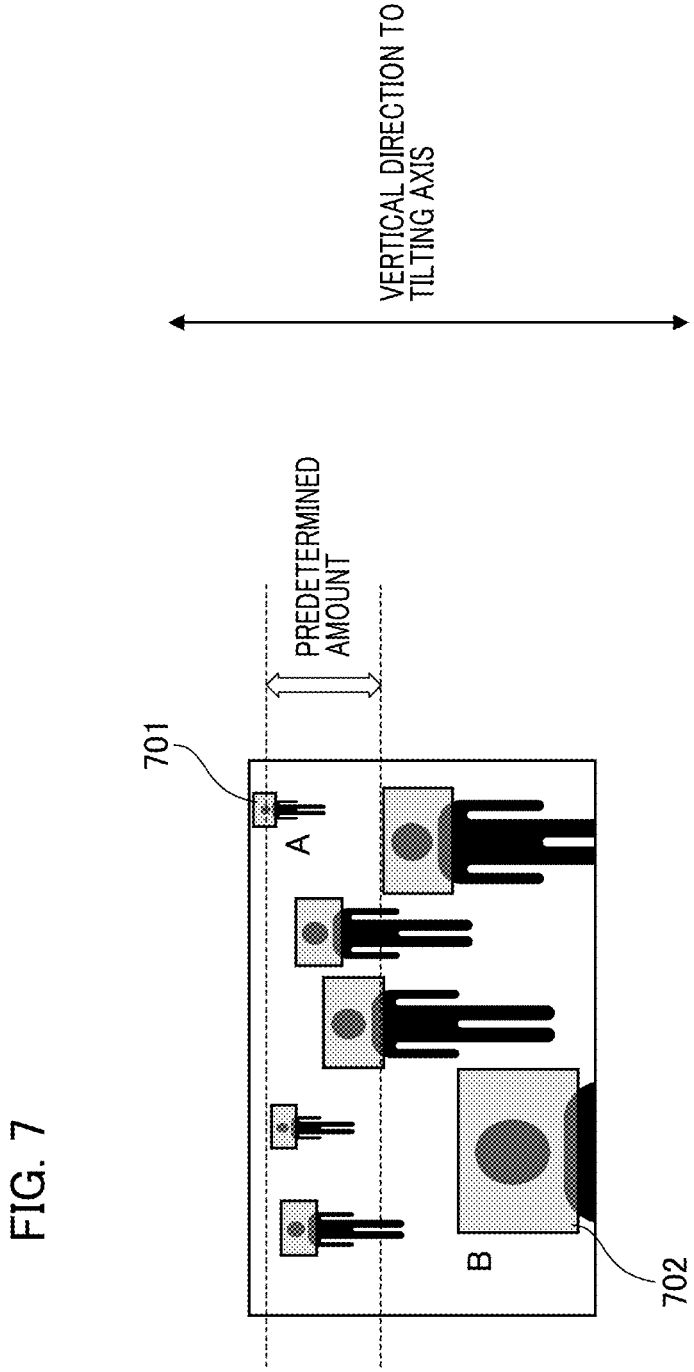
FIG. 7 is a schematic diagram illustrating setting of first and second regions according to the first embodiment.

In step S403, the focus region setting unit 113 sets a first region (a first focus region) and a second region (a second focus region) as two focus regions based on a detection result of the subject detection unit 112. The focus region setting unit 113 sets regions which are regions including the subjects detected by the subject detection unit 112 and regions including at least one pixel in the imaging frame as focus regions. The setting of the first and second regions will be described with reference to FIG. 7. FIG. 7 is a schematic diagram illustrating the setting of the first and second regions according to the first embodiment. The first region is assumed to be a region in which a subject closest to the upper end or the lower end of a screen is detected among the subjects detected by the subject detection unit 112 in one imaging frame. In other words, the first region is a region including a subject most away from the tilting axis 301. Since the upper right subject A is the closest to the upper end of the screen in FIG. 7, a region 701 in which this subject is detected is set as the first region. The second region is assumed to be a region in which a subject farthest in the vertical direction to the tilting axis on an imaging surface from the first region is detected among the subjects detected by the subject detection unit 112 in the one imaging frame. That is, a plurality of pairs of combinations of subjects a predetermined amount or more away from each other in the one imaging frame are assumed to be detected. In this case, the focus region setting unit 113 sets a combination of subjects farthest in the vertical direction to the tilting axis on the imaging surface as a focus region among the combinations of the subjects. Since a lower left subject B is farthest from the first region in the vertical direction to the tilting axis on the imaging surface in FIG. 7, a region 702 in which the subject is detected is set as the second region. Hereinafter, a direction vertical to the tilting axis on the imaging surface (the vertical direction to the tilting axis illustrated in FIG. 7) is simply referred to as "a vertical direction to the tilting axis."

Step S404

In step S404, the information acquisition unit 114 acquires the positional information and the focal information in the first and second regions set in step S403. Here, the positional information is values illustrated as $k_a$ and $k_b$ in FIG. 3B and are distances from the tilting axis 301 to the first and second regions in the vertical direction to the tilting axis 301 on the image sensor 106. The focal information is values denoted by a and b in FIG. 3B and are defocus amounts of the subjects A and B in the first region at a present position of the image sensor 106.

Step S405

In step S405, the correction amount calculation unit 115 determines whether appropriate correction amounts of the information acquired in step S404 can be calculated in the calculation of the correction amounts for adjustment through the tilting control. When the first and second regions are the predetermined amount or more away from each other in the vertical direction to the tilting axis 301 in the determination. In FIG. 3B, the appropriate correction amounts can be calculated in the calculation of the correction amounts for adjustment through the tilting control. This is because the calculated tilting correction amount α is considerably affected by acquisition errors of the pieces of focal information a and b when the points A and B are far very little in the vertical direction to the tilting axis. Accordingly, as illustrated in FIG. 7, a predetermined amount (a threshold) of a difference between pieces of positional information of the first and second regions in the vertical direction to the tilting axis is provided, and the correction amount calculation unit 115 determines whether the difference between the positional information of the first region and the positional information of the second region is equal to or greater than the predetermined amount. Specifically, the correction amount calculation unit 115 obtains each piece of positional information based on an F value, a focal distance, and a subject distance. As illustrated in FIG. 7, in the imaging frame of the first embodiment, the difference between the positional information of the first region and the positional information of the second region is equal to or greater than the predetermined amount (Yes). Therefore, the process proceeds to step S406.

Step S406

In step S406, the correction amount calculation unit 115 calculates the tilting correction amount and the focus correction amount from the positional information and the focal information of the first and second regions acquired in step S404. Here, the tilting correction amount is a value denoted by a in FIG. 3C and the focus correction amount is a value denoted by β in FIG. 3C. The tilting correction amount and the focus correction amount are calculated with the foregoing Expressions 2 and 3, respectively.

Step S407

In step S407, the tilting control unit 116 performs tilting control based on the tilting correction amount calculated in step S406. The focus control unit 117 performs focus control based on the focus correction amount calculated in step S406. In this way, a focus surface appropriate for a scene is formed.

As described above, by automatically setting the two focus regions based on the subject detection result and calculating the tilting correction amount and the focus correction amount from the acquired positional information and focal information, it is possible to form the focus surface appropriate for the scene.

Second Embodiment

A second embodiment relates to a method of performing adjustment through tilting control by setting two focus regions in a scene in which the number of subjects present in any one frame of a captured video is singular.

Hereinafter, a sequence in which the imaging device 100 performs the tilting control process according to the second embodiment will be described with reference to FIGS. 4 and 5. The detailed description common to that of the first embodiment w ill be omitted.

Step S401

Figure 8:
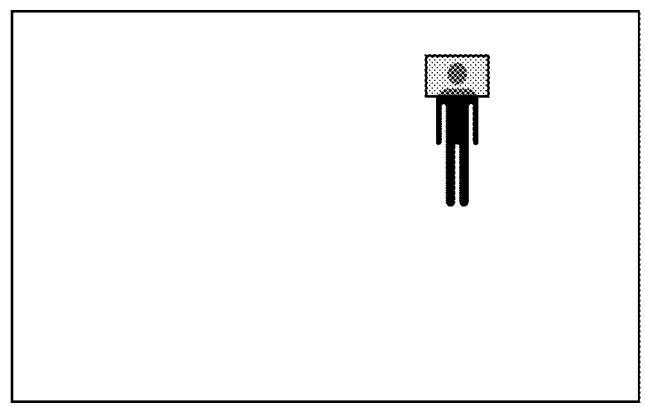
FIG. 8 is a schematic diagram illustrating an example of an imaging frame which is a target in a second embodiment.

In step S401, the focus region setting unit 113 determines whether a subject is detected in an input image. FIG. 8 is a schematic diagram illustrating an example of an imaging frame which is a target in the second embodiment. When the subject detection unit 112 performs the detection on a face as a target, rectangular portions are detected as subjects.

Step S402

In step S402, when it is determined in step S401 that the subject is detected (Yes), the focus region setting unit 113 determines whether the number of detected subjects is a plural. In the imaging frame which is a target in the second embodiment, as illustrated in FIG. 8, the number of detected subjects is singular (No). Therefore, the process proceeds to step S408.

Step S408

Figure 9:
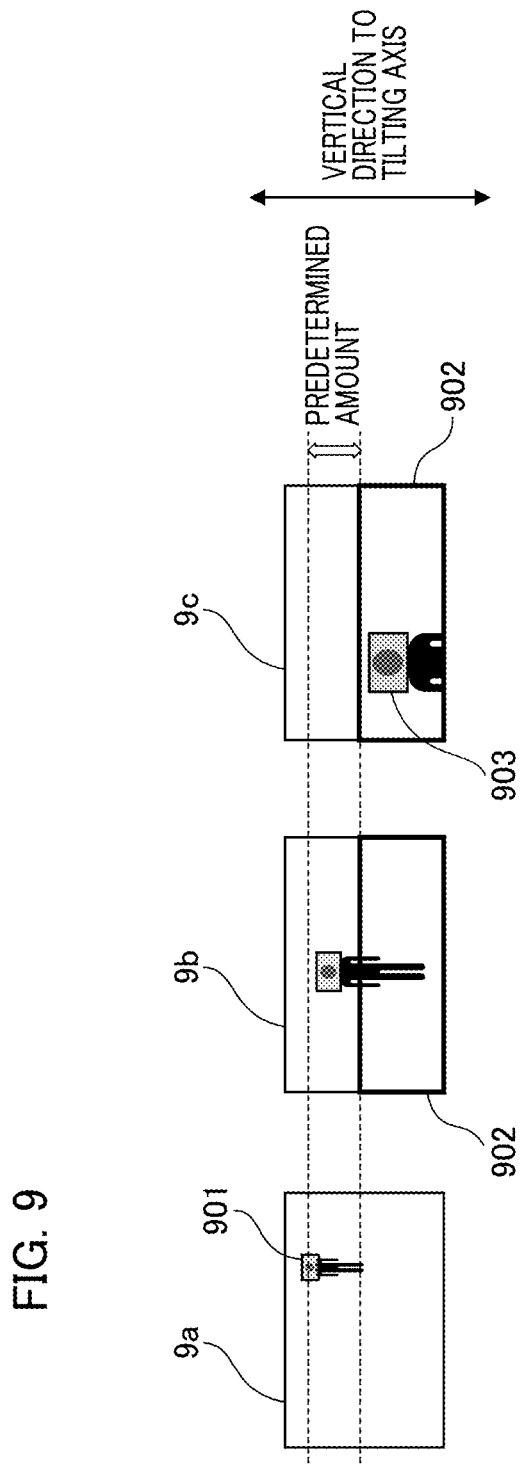
FIG. 9 is a schematic diagram illustrating setting of first and second regions according to the second embodiment.

In step S408, the focus region setting unit 113 sets a first region (a first focus region) based on a detection result by the subject detection unit 112. FIG. 9 is a schematic diagram illustrating the setting of the first and second regions according to the second embodiment. In an imaging frame 9a, the first region is set. In the imaging frame 9a, the number of detected subjects is singular. Therefore, the focus region setting unit 113 sets a region 901 in which the subject is detected as the first region.

Step S409

In step S409, the information acquisition unit 114 acquires the positional information and the focal information in the first region set in step S408. The positional information and the focal information are the same as the information acquired in step S404 of the first embodiment.

Step S410

In step S410, frame updating is performed from the imaging frame 9a in which the first region is set to an imaging frame different from the imaging frame 9a. An imaging frame 9b is an imaging frame after the frame updating. That is, the imaging frame 9b is an imaging frame as time proceeds from the imaging frame 9a.

Step S411

In step S411, the focus region setting unit 113 determines whether a subject is detected in the imaging frame 9b after the updating. When it is determined that the subject is detected (Yes), the process proceeds to step S412. When it is determined that the subject is not detected (No), the process returns to the previous step S410 to update the frame again. In the imaging frame 9b, the subject is detected. Therefore, the process proceeds to step S412.

Step S412

In step S412, the focus region setting unit 113 determines whether there is a region more appropriate as the first region in the imaging frame 9b after the updating. Here, a region appropriate as the first region is a region in which a subject closer from the upper or lower end of a screen is detected. In other words, the region is a region in which a subject is detected and is a region farther from the tilting axis 301. The focus region setting unit 113 determines whether there is a region in which a subject closer from the upper or lower end of the screen than in the first region (the region 901) set in the imaging frame 9a before the updating is detected in the imaging frame 9b after the updating. In other words, the focus region setting unit 113 determines whether, in the imaging frame 9b after the updating, there is a region which is a region in which the subject is detected and a region farther from the tilting axis 301 in the first region set in the imaging frame 9a before the updating. When it is determined that there is the region (Yes), the process proceeds to step S413. When it is determined that there is no region (No), steps S413 and S414 are skipped and the process proceeds to step S415. In the imaging frame 9b, there is no region in which a subject closer from the upper or lower end of the screen is detected (No), compared to the imaging frame 9a before the updating. Accordingly, steps S413 and S414 are skipped.

Step S415

In step S415, the focus region setting unit 113 sets a subject waiting region necessary to set a second region. In the imaging frame 9b of FIG. 9, a region 902 is shown as the set subject waiting region. The subject waiting region (the region 902) is set as a range a predetermined amount away from a position in the vertical direction to the tilting axis 301 to an end of the screen at which there is no first region by using the position of the previously set first region (the region 901) as a reference. That is, when a subject is detected in the subject waiting region (the region 902), the subject waiting region is set as the second region, and thus a region which is a predetermined amount or more away from the first region is set as the second region. Here, the reason why the regions the predetermined amount away from each other are set as the first and second regions is that, as in step S405 of the first embodiment, the calculation of the correction amounts for adjustment through the tilting control is hardly affected by an acquisition error of the focal information.

Step S416

In step S416, the focus region setting unit 113 determines whether a subject is detected in the subject waiting region. In the imaging frame 9b, the subject is not detected in the subject waiting region (the region 902) (No). Therefore, the process returns to step S410 to perform steps 410 to S416 again. An imaging frame 9c is an imaging frame obtained by further performing the frame updating on the imaging frame 9b. In the imaging frame 9c, the subject is detected in the subject waiting region (the region 902) by moving the subject (Yes). Therefore, the process proceeds to step S417.

Step S417

In step S417, the focus region setting unit 113 sets the second region. Specifically, the focus region setting unit 113 sets a region 903 in which the subject is detected in step S416 in the subject waiting region (the region 902), as the second region.

Step S418

In step S418, the information acquisition unit 114 acquires the positional information and the focal information in the second region set in step S417. The positional information and the focal information are the same as the information acquired in step S404 of the first embodiment.

Step S406

In step S406, the correction amount calculation unit 115 calculates the tilting correction amount and the focus correction amount from the positional information and the focal information of the first region acquired in step S409 and the positional information and the focal information of the second region acquired in step S418. The tilting correction amount and the focus correction amount are obtained by a calculation method similar to the same steps of the first embodiment.

Step S407

In step S407, the tilting control unit 116 performs tilting control based on the tilting correction amount calculated in step S406. The focus control unit 117 performs focus control based on the focus correction amount calculated in step S406. In this way, a focus surface appropriate for a scene is formed.

As described above, by setting the two focus regions between the plurality of imaging frames and calculating the tilting correction amount and the focus correction amount from the acquisition result of the positional information and the focal information even in a scene in which there is only one subject, it is possible to form the focus surface appropriate for the scene. A frame interval between a first imaging frame in which the first region is set and a second imaging frame in which the second region is set is preferably equal to or less than a predetermined threshold.

Third Embodiment

A third embodiment relates to a method of setting two focus regions in a scene in which the number of subjects present in any one frame of a captured video is plural and a difference between the positions of subjects in the vertical direction to the tilting axis is not a predetermined amount or more away and performing adjustment through the tilting control.

Hereinafter, a sequence performed in the imaging device 100 and illustrated in the flowchart of a process in the third embodiment will be described with reference to FIGS. 4 and 5. The detailed description common to those of the first and second embodiments will be omitted.

Step S401

Figure 10:
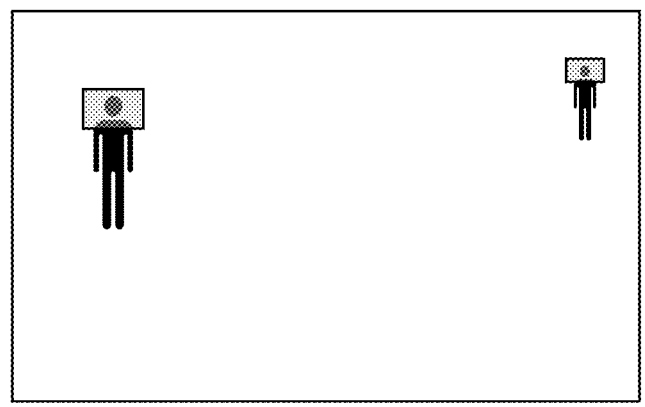
FIG. 10 is a schematic diagram illustrating an example of an imaging frame which is a target in a third embodiment.

In step S401, the focus region setting unit 113 determines whether a subject is detected in an input image. FIG. 10 is a schematic diagram illustrating an example of an imaging frame which is a target in the third embodiment. When the subject detection unit 112 performs the detection on faces as targets, rectangular portions are detected as subjects.

Step S402

In step S402, when it is determined in step S401 that the subjects are detected (Yes), the focus region setting unit 113 determines whether the number of detected subjects is a plural. In the imaging frame which is a target in the third embodiment, as illustrated in FIG. 10, the number of detected subjects is plural (Yes). Therefore, the process proceeds to step S403.

Step S403

In step S403, the focus region setting unit 113 sets a first region (a first focus region) and a second region (a second focus region) as focus regions based on a detection result of the subject detection unit 112. A method of setting the first and second regions is similar to the same steps of the first embodiment. FIG. 11 is a schematic diagram illustrating setting of the first and second regions according to the third embodiment. In an imaging frame 11a, the first and second regions are set. In the imaging frame 11a, the number of detected subjects is plural. Therefore, the focus region setting unit 113 sets a region 1101 in which the subject is detected as the first region and sets a region 1102 as the second region.

Step S404

In step S404, the information acquisition unit 114 acquires the positional information and the focal information in the first and second regions set in step S403. The positional information and the foal information are similar to the information acquired in the same step of the first embodiment.

Step S405

In step S405, the correction amount calculation unit 115 determines whether appropriate correction amounts of the information acquired in step S404 can be calculated in the calculation of the correction amounts for adjustment through the tilting control. In the determination, similarly to the same step of the first embodiment, it is determined whether the first and second regions are the predetermined amount away from each other in the vertical direction to the tilting axis. In the third embodiment, as shown in the imaging frame 11a, the first region (the region 1101) and the second region (the region 1102) are not the predetermined amount away from each other (No). Therefore, the process proceeds to step S410.

Step S410

In step S410, frame updating is performed from the imaging frame 11a in which the first and second regions are set to an imaging frame different from the imaging frame 11a. An imaging frame 11b is an imaging frame after the frame updating.

Step S411

In step S411, the focus region setting unit 113 determines whether a subject is detected in the imaging frame 11b after the updating. In the imaging frame 11b, the subject is detected. Therefore, the process proceeds to step S412.

Step S412

In step S412, the focus region setting unit 113 determines whether there is a region more appropriate as the first region in the imaging frame 11b after the updating. In the determination method, as in the same step of the second embodiment, it is determined whether there is a region in which a subject closer from the upper or lower end of the screen than in the first region (the region 1101) set in the imaging frame 11a before the updating is detected in the imaging frame 11b after the updating. In the imaging frame 11b, there is no region in which a subject closer from the upper or lower end of the screen than in the first region (the region 1101) set in the imaging frame 11a before the updating is detected (No). Accordingly, the process proceeds to step S415.

Step S415 (First Time)

In step S415, the focus region setting unit 113 sets a subject waiting region necessary to set the first and second regions the predetermined amount or more away from each other in the vertical direction to the tilting axis. In order for the calculation of the correction amounts for adjustment through the tilting control to be hardly affected by an acquisition error of the focal information, the first and second regions are necessarily the predetermined amount or more away from each other in the vertical direction to the tilting axis direction. However, the first region (the region 1101) and the second region (the region 1102) first set in step S403 of the embodiment and shown in the imaging frame 11a are not regions the predetermined amount away from each other. In order to set the second region and the first region the predetermined amount or more away from each other, a region 1103 is set as a subject waiting region, as shown in the imaging frame 11b. A range of the subject waiting region is similar to the range set in the same step of the second embodiment.

Step S416 (First Time)

In step S416, the subject detection unit 112 determines whether a subject is detected in the subject waiting region (the region 1103). In the imaging frame 11b, the subject is not detected in the subject waiting region (the region 1103) (No). Therefore, the process returns to step S410 to perform steps 410 to S416 again.

Here, a case in which the imaging frame 11b is updated to an imaging frame 11c in second frame updating (S410) will be described. The repeated description of the process from step S410 of the first time to step S416 will be omitted. In the imaging frame 11c, there is a region 1104 in which a subject closer from the upper or lower end of the screen than in the first region (the region 1101) set in the imaging frame 11a before the updating is detected (Yes in S412). Therefore, the process proceeds from step S412 of the second time to step S413.

Step S413

In step S413, the focus region setting unit 113 resets the first region. The region reset as the first region is a region in which a subject closer from the upper or lower end of the screen in the imaging frame 11c after the updating is detected. In other words, the region is a region in which a subject is detected and is a region farther from the tilting axis 301. In the imaging frame 11c, there is a region 1104 in which a subject closer from the upper end of the screen than in the first region (the region 1101) set in the imaging frame 11a is detected. Accordingly, the region 1104 closer from the upper end of the screen is reset as the new first region.

Step S414

In step S414, the information acquisition unit 114 acquires the positional information and the focal information in the first region (the region 1104) reset in step S413. The positional information and the focal information are similar to the information acquired in step S404 of the first embodiment.

Step S415 (Second Time)

In step S415 of the second time, when the first region is reset, the focus region setting unit 113 resets the subject waiting region. A method of resetting the subject waiting region is similar to S415 of the embodiment. Here, a region 1105 is set as the subject waiting region.

Step S416 (Second Time)

In step S416, the focus region setting unit 113 determines whether a subject is detected in the subject waiting region (the region 1105). In the imaging frame 11c, the subject is detected in the subject waiting region (the region 1105) (Yes). Therefore, the process proceeds to step S417. Here, the subject waiting region (the region 1103) set in the imaging frame 11b which is the imaging frame before the frame updating is compared with the subject waiting region (the region 1105) set in the present imaging frame 11c. Then, it can be understood that areas of the regions, the subject waiting region (the region 1105) set in the imaging frame 11c and the subject waiting region (the region 1103) set in the imaging frame 11b, are spread. Thus, it is possible to raise a probability of the subject being detected in the subject waiting region. As a result, it is possible to set the second region faster. Accordingly, it is possible to improve responsiveness of adjustment execution through the tilting control.

Step S417

In step S417, the focus region setting unit 113 rests the region in which the subject is detected as the second region in the subject waiting region (the region 1105) in step S416. Specifically, the focus region setting unit 113 resets a region 1106 as the second region in the imaging frame 11c.

Step S418

In step S418, the information acquisition unit 114 acquires the positional information and the focal information in the second region set in step S417. The positional information and the focal information are the same as the information acquired in step S404 of the first embodiment.

Step S406

In step S406, the correction amount calculation unit 115 calculates the tilting correction amount and the focus correction amount. Specifically, the correction amount calculation unit 115 uses the positional information and the focal information of the reset first region (the region 1104) acquired in step S414 and the positional information and the focal information of the reset second region (the region 1106) acquired in step S418. The tilting correction amount and the focus correction amount are calculated in a calculation method similar to the calculation of the same step of the first embodiment.

Step S407

In step S407, the tilting control unit 116 performs tilting control based on the tilting correction amount calculated in step S406. The focus control unit 117 performs focus control based on the focus correction amount calculated in step S406. In this way, a focus surface appropriate for a scene is formed.

As described above, even in a scene in which a plurality of subjects are not far, two information acquisition regions are set between different frames, and the tilting correction amount and the focus correction amount based on the positional information and the focal information in the set regions are calculated. In this way, a focus surface appropriate for a scene is formed.

OTHER EMBODIMENTS

While the present invention has been described with reference to exemplary embodiments, it is to be understood that the invention is not limited to the disclosed exemplary embodiments.

For example, in the above-described embodiments, the focal information is assumed to be the defocus amount. However, when a subject which is an imaging target can be followed by an imaging device, only a focal position can be used as the focal information. In this case, the focal information is obtained based on the position of a focus lens.

Further, since the focus region may be set a plurality of times, the focus region may be set three or more times. In this case, of a plurality of focus regions, focus regions farthest from each other are necessarily away from each other a predetermined amount or more in the vertical direction to the tilting axis. When three or more focus regions are set, the correction amount calculation unit 115 calculates the correction amount so that an imaging surface matches a focal position of each focus region. In other words, the correction amount calculation unit 115 calculates the correction amount so that an error from a focal position in each focus region is smaller, preferably, the minimum.

Further, for example, by performing not only the tilting control in the horizontal direction but also biaxial tilting control similarly in addition to the vertical direction, it is possible to implement tilting control in which recognizability of subjects on two planes is maintained.

In the foregoing embodiments, the examples in which the calculation results are derived by causing a CPU or the like to perform calculation using the expressions have been described. However, instead of the calculation in which the expression are used, tables corresponding to the expressions may be stored in advance in a memory (not illustrated) and results similar to the calculation results based on the expressions may be directly derived using the tables.

The scope of the following claims is to be accorded the broadest interpretation to encompass all such modifications and equivalent structures and functions. In addition, as a part or the whole of the control according to this embodiment, a computer program realizing the function of the embodiment described above may be supplied to the imaging device through a network or various storage media. Then, a computer (or a CPU, an MPU, or the like) of the imaging device may be configured to read and execute the program. In such a case, the program and the storage medium storing the program configure the present invention.

This application claims the benefit of Japanese Patent Application No. 2021-027430 filed on Feb. 24, 2021, which is hereby incorporated by reference herein in its entirety.

What is claimed is:

1. An imaging device comprising:
a focus driving portion that drives a focus lens;
a tilting driving portion that tilts at least one of an image sensor and an imaging optical system with respect to a surface orthogonal to an optical axis of the imaging optical system;
at least one processor or circuit configured to function as:
a detection unit configured to detect a subject in an image;
a setting unit configured to set a plurality of focus regions in the image based on positional information of the subject detected in the image;
a determination unit configured to determine respective driving amounts for the focus driving unit and for the tilting driving unit based on the positional information and focal information of the plurality of focus regions so that the plurality of focus regions is in focus; and
a control unit configured to control the focus driving unit and the tilting driving unit based on the determined respective driving amounts,
wherein the setting unit sets, as the focus regions, a plurality of regions which include the subjects a predetermined amount or more away from each other in a vertical direction to a tilting axis in the image among the subjects detected in the image.

2. The imaging device according to claim 1, wherein the setting unit sets the plurality of focus regions in one imaging frame or a plurality of imaging frames in accordance with the number of subjects detected in the image.

3. The imaging device according to claim 1, wherein, in a case where the plurality of subjects the predetermined amount or more away from each other are detected in one imaging frame,
the setting unit sets a region including one of the subjects among the plurality of subjects of the one imaging frame as a first focus region and sets a region including the subject the predetermined amount or more away from the first focus region as a second focus region.

4. The imaging device according to claim 3, wherein, in a case where a plurality of pairs of combinations of the subjects the predetermined amount away from each other are detected in one imaging frame,
the setting unit sets a region including one of the subjects in a combination of the subjects farthest in the vertical direction as the first focus region and sets a region including the other subject as the second focus region.

5. The imaging device according to claim 1, wherein, in a case where the number of detected subjects is singular in a first imaging frame,
the setting unit sets a region including the subject detected in the first imaging frame as the first focus region and sets a region including the subject detected in a second imaging frame and the predetermined amount or more away from the first focus region as the second focus region.

6. The imaging device according to claim 1, wherein, in a case where the number of detected subjects is plural and the plurality of subjects the predetermined amount or more away from each other are not detected in a first imaging frame,
the setting unit sets a region including one subject desired to be detected in the first imaging frame as a first focus region and sets a region including the subject detected in a second imaging frame and the predetermined amount or more away from the first focus region as a second focus region.

7. The imaging device according to claim 5, wherein the setting unit sets a region including the subject farthest from the tilting axis among the plurality of subjects detected in the first imaging frame as the first focus region.

8. The imaging device according to claim 5, wherein, in a case where the first focus region is set in the first imaging frame and the subject further from the tilting axis than the subject included in the set first focus region is detected in the second imaging frame,
the setting unit resets a region including the subject detected in the second imaging frame as the first focus region.

9. The imaging device according to claim 5, wherein, in a case where the first and the second focus regions are set in the different frames,
the setting unit sets an imaging frame of which an inter-frame interval from the first imaging frame is equal to or less than a predetermined threshold as the second imaging frame.

10. The imaging device according to claim 1, wherein the positional information is information based on a position in a vertical direction to the tilting axis on the image sensor.

11. The imaging device according to claim 1, wherein the positional information is obtained based on at least one of an F value, a focal distance, and a subject distance.

12. The imaging device according to claim 1, wherein the focal information is information based on at least one of a focus lens position and a defocus amount.

13. The imaging device according to claim 1, wherein the focus region is a region including at least one pixel in the imaging frame.

14. A non-transitory computer-readable storage medium configured to store a computer program for an imaging device to execute the following steps:
detecting a subject in an image;
setting a plurality of focus regions in the images in accordance with positional information of a subject detected in the image;
determining respective driving amounts for driving a focus lens and for tilting at least one of an image sensor and an imaging optical system with respect to a surface orthogonal to an optical axis of the imaging optical system based on the positional information and focal information of the plurality of focus regions so that the plurality of focus regions is in focus; and
driving the focus lens and tilting at least one of the image sensor and the imaging optical system based on the determined respective driving amounts,
wherein in the setting, a plurality of regions which include the subjects a predetermined amount or more away from each other in a vertical direction to a tilting axis in the image among the subjects detected in the image is set as the focus regions.

15. A method of controlling an imaging device, the method comprising:
detecting a subject in an image;
setting a plurality of focus regions in an image in accordance with positional information of a subject detected in the image;
determining respective driving amounts for driving a focus lens and for tilting at least one of an image sensor and an imaging optical system with respect to a surface orthogonal to an optical axis of the imaging optical system based on the positional information and focal information of the plurality of focus regions so that the plurality of focus regions is in focus; and
driving the focus lens and tilting at least one of the image sensor and the imaging optical system based on the determined respective driving amounts,
wherein in the setting, a plurality of regions which include the subjects a predetermined amount or more away from each other in a vertical direction to a tilting axis in the image among the subjects detected in the image is set as the focus regions.

\* \* \* \* \*